(12) United States Patent
Park et al.

(10) Patent No.: US 7,649,490 B2
(45) Date of Patent: Jan. 19, 2010

(54) METHOD, AND APPARATUS FOR MEASURING DISTANCE USING RADIO FREQUENCY SIGNAL

(75) Inventors: Jun-ho Park, Hwaseong-si (KR); Seok-won Bang, Seoul (KR); Ji-young Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 264 days.

(21) Appl. No.: 11/907,947

(22) Filed: Oct. 18, 2007

(65) Prior Publication Data

US 2008/0143582 A1    Jun. 19, 2008

(30) Foreign Application Priority Data

Dec. 19, 2006   (KR) .................. 10-2006-0130140

(51) Int. Cl.
- *G01S 13/00* (2006.01)
- *G01S 13/08* (2006.01)
- *G01C 22/00* (2006.01)
- *G01C 21/00* (2006.01)
- *B25J 5/00* (2006.01)

(52) U.S. Cl. .................. 342/118; 342/70; 342/125; 701/26; 701/223; 318/568.12

(58) Field of Classification Search ............. 342/70–72, 342/118, 123–125, 165, 173, 174; 340/854.1, 340/854.2, 854.6; 701/26, 117, 223, 301; 318/568.12; 901/1, 46
See application file for complete search history.

(56) References Cited

U.S. PATENT DOCUMENTS

| | | | | | |
|---|---|---|---|---|---|
| 4,833,480 | A | * | 5/1989 | Palmer et al. ............... | 342/125 |
| 5,291,207 | A | * | 3/1994 | Kikuchi et al. ............... | 342/70 |
| 5,675,342 | A | * | 10/1997 | Sharpe ....................... | 340/10.2 |
| 5,677,927 | A | * | 10/1997 | Fullerton et al. ............. | 375/130 |
| 5,701,127 | A | * | 12/1997 | Sharpe ....................... | 340/10.2 |
| 5,734,346 | A | * | 3/1998 | Richardson et al. ......... | 342/124 |
| 5,959,570 | A | * | 9/1999 | Russell ....................... | 342/70 |
| 6,374,155 | B1 | * | 4/2002 | Wallach et al. .............. | 700/245 |
| 6,496,755 | B2 | * | 12/2002 | Wallach et al. .............. | 700/245 |
| 6,560,463 | B1 | * | 5/2003 | Santhoff ..................... | 455/522 |
| 6,687,571 | B1 | * | 2/2004 | Byrne et al. ................. | 700/245 |

(Continued)

FOREIGN PATENT DOCUMENTS

JP              6-317659           11/1994

(Continued)

*Primary Examiner*—Thomas H Tarcza
*Assistant Examiner*—Peter M Bythrow
(74) *Attorney, Agent, or Firm*—Staas & Halsey LLP (57) ABSTRACT

Provided are a method, apparatus, and medium for measuring a distance using a radio frequency (RF) signal. The method of measuring a distance includes setting the transmitter power of an RF signal of a signal generating module to a minimum so as to measure the longest distance when no obstacle exists, measuring a distance between the signal generating module and a fixed module using the RF signal whose transmitter power is set to the minimum, if the measured distance between the signal generating module and the fixed module is available, determining that no obstacle exists therebetween, and if the measured distance is not available, determining that an obstacle exists therebetween, and determining the distance according to the result of the determination of existence of an obstacle.

25 Claims, 7 Drawing Sheets

U.S. PATENT DOCUMENTS

| | | | |
|---|---|---|---|
| 6,763,282 B2 * | 7/2004 | Glenn et al. | 700/245 |
| 6,804,607 B1 * | 10/2004 | Wood | 701/301 |
| 6,819,286 B2 * | 11/2004 | Armbruster et al. | 342/387 |
| 6,859,164 B2 * | 2/2005 | Kurita et al. | 342/28 |
| 7,117,067 B2 * | 10/2006 | McLurkin et al. | 700/245 |
| 7,129,886 B2 * | 10/2006 | Hall et al. | 342/28 |
| 7,254,464 B1 * | 8/2007 | McLurkin et al. | 700/245 |
| 7,439,901 B2 * | 10/2008 | Needham et al. | 342/30 |
| 7,456,596 B2 * | 11/2008 | Goodall et al. | 318/568.12 |
| 2003/0208304 A1 * | 11/2003 | Peless et al. | 700/245 |
| 2003/0212472 A1 * | 11/2003 | McKee | 700/245 |
| 2005/0113990 A1 * | 5/2005 | Peless et al. | 701/23 |

FOREIGN PATENT DOCUMENTS

| | | |
|---|---|---|
| JP | 2005-86262 | 3/2005 |
| KR | 2003-0091310 | 12/2003 |
| KR | 10-2006-0089840 | 8/2006 |

* cited by examiner

MEASURED DISTANCE VALUE WITH RESPECT TO TRANSMITTER POWER
(IN CASE THERE IS NO OBSTACLE)

FIG. 4

MEASURED DISTANCE VALUE WITH RESPECT TO TRANSMITTER POWER
(IN CASE THERE IS OBSTACLE)

METHOD, AND APPARATUS FOR MEASURING DISTANCE USING RADIO FREQUENCY SIGNAL

CROSS-REFERENCE TO RELATED APPLICATIONS

This application claims priority benefit from Korean Patent Application No. 10-2006-0130140 filed on Dec. 19, 2006 in the Korean Intellectual Property Office, the disclosure of which is incorporated herein by reference in its entirety.

BACKGROUND

1. Field

Embodiments relate to a method, apparatus, and medium for measuring a distance using a radio frequency (RF) signal, and more particularly, to a method, apparatus, and medium for measuring a distance by which even though an obstacle exists between a signal generating module for measuring a distance and a fixed module and therefore line of sight (LOS) between the two modules is not guaranteed, an RF signal is received, the distance is measured, and existence of an obstacle is determined, thereby improving the accuracy of distance measurement.

2. Description of the Related Art

Mobile robots, such as cleaning robots and security robots, are used in homes or offices. In order to specify a path or region for a mobile robot's movement and to avoid collision of a mobile robot with an obstacle in the region, accurate information on the position of the robot is necessary.

A variety of methods have been studied in order to obtain position information of a robot, and recently a distance measuring module using a radio frequency (RF) has been under development. According to the distance measuring method using an RF signal, a signal generating module generates and transmits a signal of a predetermined frequency, and a fixed module disposed at a fixed position receives the signal and transmits the signal back to the signal generating module. In this way, the distance is measured using the time taken for the signal generating module to receive the signal generated and the speed of the signal.

Unlike other methods, the method using an RF signal can measure distance between two things through transmission and reception of an RF signal even when an obstacle exists between the two things, and therefore line-of-sight (LOS) is not guaranteed. That is, the method has an advantage that it can be used even in an indoor environment where furniture and walls exist.

However, if this method is applied to a mobile robot, an error occurs in measuring the distance due to interference by an obstacle that can exist between a signal generating module disposed in the robot and a fixed module, such as a wall. Accordingly, it is necessary to reduce an error that occurs due to lack of LOS and to increase the accuracy of distance measurement.

SUMMARY

In an aspect of embodiments, a method and apparatus for measuring distance by which even though an obstacle exists between distance measuring modules and therefore line of sight (LOS) is not guaranteed, measuring distance is enabled using a radio frequency (RF) signal, and existence of an obstacle is determined by changing a transmitter power of an RF signal, thereby improving accuracy of distance measurement.

According to an aspect of embodiments, there is provided a method for measuring a distance using a radio frequency (RF) signal, the method comprising setting a transmitter power of an RF signal of a signal generating module to a minimum so as to measure the longest distance within a region when no obstacle exists between the signal generating module and a fixed module, measuring a distance between the signal generating module and the fixed module using the RF signal whose transmitter power is set to the minimum, if the measured distance between the signal generating module and the fixed module is available, determining that no obstacle exists therebetween, and if the measured distance is not available, determining that an obstacle exists therebetween, and determining the distance according to the result of the determination of existence of an obstacle.

According to another aspect of embodiments, there is provided a method of measuring a distance using an RF signal, the method including setting the transmitter power of an RF signal of a signal generating module to a minimum so that when no obstacle exists in a region between the signal generating module and a fixed module, a longest distance within the region can be measured, generating the signal by increasing the transmitter power set to the minimum, of the signal, by a preset interval until the transmitter becomes a maximum, and storing the distance values measured between the signal generating module and the fixed module, and the transmitter powers, using the stored distance values with respect to transmitter powers, if the measured distance is available using the signal at the transmitter power set to the minimum, determining that no obstacle exists between the signal generating module and the fixed module, and if the distance cannot be measured, determining that an obstacle exists, and determining the distance according to whether or not an obstacle exists.

According to still another aspect of embodiments, there is provided an apparatus for measuring a distance using an RF signal, the apparatus including a signal generating module to generate an RF signal and receiving back the transmitted signal, a fixed module at a fixed position to receive the transmitted signal and then, to transmit the received signal, a distance measuring module to measure the distance between the signal generating module and the fixed module, using the generated signal, an obstacle determining module to determine whether or not an obstacle exists between the signal generating module and the fixed module, and a distance determining module to determine the distance using the measured distance value and distance data that is pre-measured with respect to the transmitter power and the distance, wherein the signal generating module generates an RF signal, by setting the transmitter power of the RF signal to a minimum so that when no obstacle exists between the signal generating module and a fixed module in a region measured, a longest distance can be measured, and the distance measuring module measures the distance using the generated signal, and if the measured distance is available, the obstacle determining module determines that no obstacle exists between the signal generating module and the fixed module, and if the distance cannot be measured, the obstacle determining module determines that the obstacle exists.

According to a further aspect of embodiments, there is provided an apparatus for measuring a distance using an RF signal, the apparatus including a signal generating module to generate an RF signal and to receive back the transmitted signal, a fixed module at a fixed position to receive the transmitted signal and then, to transmit the received signal, a distance measuring module to measure the distance between the signal generating module and the fixed module, using the generated signal, a storage module to store the measured distance and the transmitter power, an obstacle determining module to determine whether or not an obstacle exists between the signal generating module and the fixed module, and a distance determining module to determine the distance using the measured distance value and distance data that is pre-measured with respect to the transmitter power and the distance, wherein the signal generating module sets the transmitter power of an RF signal to a minimum so that when no obstacle exists between the signal generating module and a fixed module in a region, and the distance measuring module measures the distance by increasing the transmitter power of the signal by a preset interval until the transmitter power becomes a maximum, and the storage module stores the measured distance values and the corresponding transmitter powers, and if the measured distance is available using the signal generated at the transmitter power set to the minimum, the obstacle determining module determines that no obstacle exists between the signal generating module and the fixed module, and if the distance cannot be measured, the obstacle determining module determines that the obstacle exists.

BRIEF DESCRIPTION OF THE DRAWINGS

These and/or other aspects, features, and advantages will become apparent and more readily appreciated from the following description of exemplary embodiments, taken in conjunction with the accompanying drawings of which.

DETAILED DESCRIPTION OF EMBODIMENTS

Reference will now be made in detail to exemplary embodiments, examples of which are illustrated in the accompanying drawings, wherein like reference numerals refer to the like elements throughout. Exemplary embodiments are described below by referring to the figures.

First, a principle of measuring a distance using a radio frequency (RF) signal according to an exemplary embodiment will now be explained.

Figure 1A:
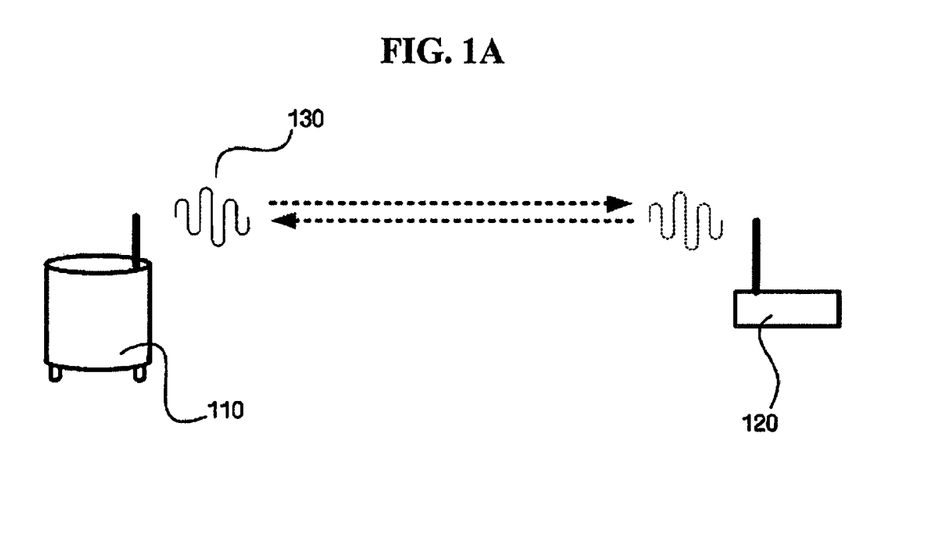
FIGS. 1A and 1B are diagrams illustrating concepts of measuring distance between a signal generating module and a fixed module using a radio frequency (RF) signal when no obstacle exists between the modules and when an obstacle exits between the modules, respectively.
Figure 1B:
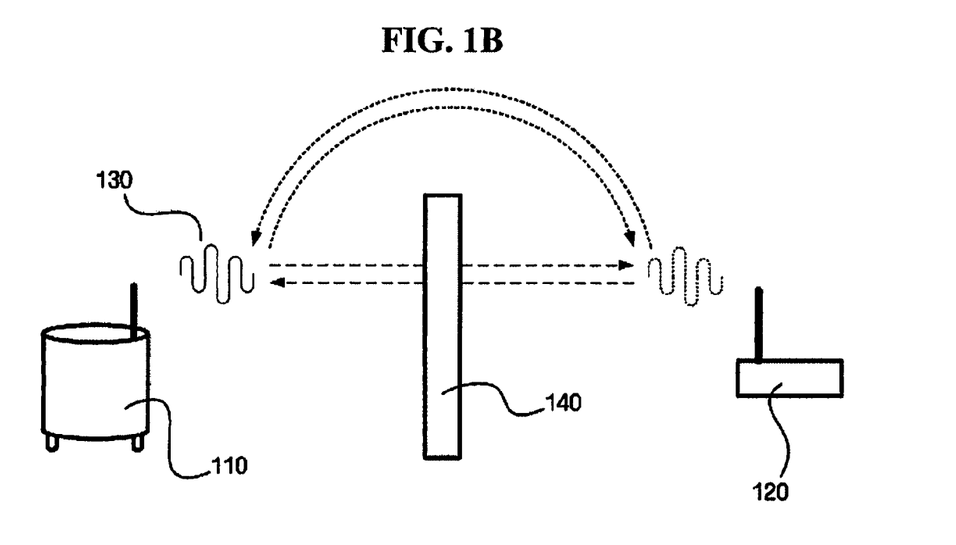

FIGS. 1A and 1B are diagrams illustrating concepts of measuring distance between a signal generating module and a fixed module using an RF signal when no obstacle exists between the modules and when an obstacle exits between the modules, respectively.

Referring to FIG. 1A, a signal generating module 110 generates an RF signal 130 with a predetermined waveform, at a predetermined transmitter power. An ultra-wideband (UWB) signal or a Bluetooth signal can be used as the RF signal. This signal is received at a fixed module 120 and an identical signal 130 is transmitted back to the signal generating module 110 by the fixed module 120. If the signal 130 transmitted by the fixed module 120 is received by the signal generating module 110, the distance between the signal generating module 110 and the fixed module 120 can be measured using the time taken from when the signal generated by the signal generating module 110 is transmitted to the fixed module 120 (when the signal generating module 110 begins transmission of the signal to the fixed module 120) until when the signal transmitted from the fixed module 120 is again received by the signal generating module 110, and the speed of the signal. That is, since the time taken for the signal generating module 110 to receive the signal 130 generated by the signal generating module 110 is the time taken for the signal 130 to make a round trip, the distance value can be obtained by multiplying the time by the speed of the signal 130 and then dividing the multiplication result by 2.

When no obstacle exists between the signal generating module 10 and the fixed module 120, as illustrated in FIG. 1A, distance is accurately measured. However, when an obstacle 1400 exists as illustrated in FIG. 1B, the signal 130 travels around the obstacle 140 or the obstacle 140 interferes with the signal. Accordingly, line-of-sight (LOS) of the signal is not guaranteed and an error occurs.

In addition, the measured distance value varies with respect to the transmitter power of the signal 130. In general, as transmitter power increases, the distance value can be measured more accurately.

Since the signal generating module 110 can be mounted on a mobile robot and moved, it can measure the distance to the fixed module 120 from a variety of positions in a range of region measured (region to be measured).

A method of measuring distance using an RF signal according to an exemplary embodiment will now be explained.

Figure 2:
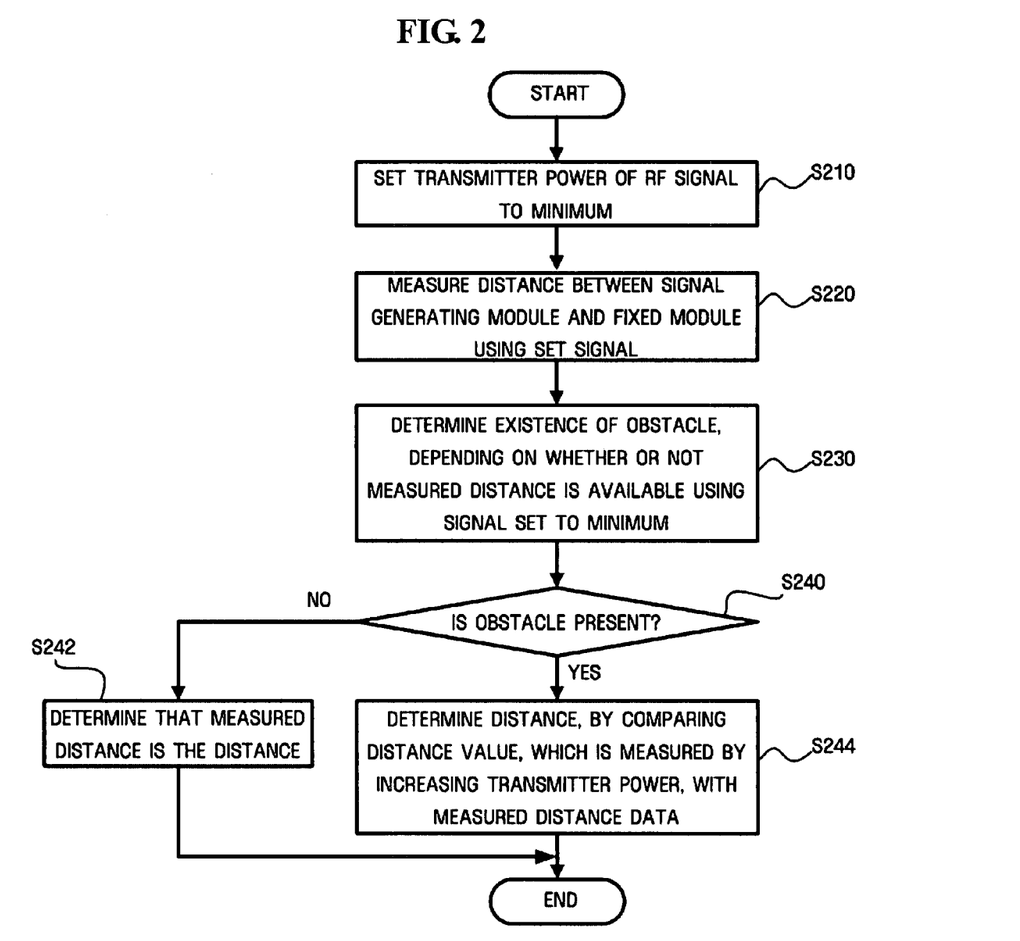
FIG. 2 is a flowchart illustrating a method for measuring distance using an RF signal according to an exemplary embodiment.

FIG. 2 is a flowchart illustrating a method of measuring distance using an RF signal according to an exemplary embodiment.

First, the transmitter power of an RF signal of a signal generating module 410, which generates an RF signal, is set to a minimum in operation S210. Here, setting the transmitter power to the minimum denotes that the transmitter power is set such that when no obstacle exists, a longest distance can be measured within a range of region measured. If the transmitter power of an RF signal is weak, the signal cannot be received from a distant position, so that the measuring of the distance cannot be performed. In a predetermined range of region measured, such as a room, distance is measured by generating a signal at a position which is the farthest from the fixed module 420, and the transmitter power is set to a minimum at which the measured distance is available.

Next, with the signal set to the minimum, the distance between the signal generating module 410 and the fixed module 420 is measured. As described above, the measured distance is available using the time taken for receiving the generated signal and the transmission speed of the signal.

Then, according to whether or not the measured distance is available using the signal set to the minimum, it is determined whether or not an obstacle exists in operation S230. When distance is measured using a signal of an identical transmitter power, the range of distance that can be measured when an obstacle exists is shorter than the range of distance that can be measured when no obstacle exists. Accordingly, since the transmitter power is set to the minimum so that the longest distance in the range of region measured can be measured when no obstacle exists, if distance can not be measured by using transmitter power set to the minimum, it is determined that an obstacle exists between the signal generating module 410 and the fixed module 420. If the signal is received and the measured distance is available, it is determined that no obstacle exists.

If it is determined that no obstacle exists in operation S240, that is, if the signal generated at the minimum transmitter power by the signal generating module 410 is received and the measured distance is available, the measured distance value is determined as the distance between the signal generating module 410 and the fixed module 420 in operation S420. This is because, as described above, if no obstacle exists, the distance measured using the RF signal is quite accurate. The accuracy of this distance value can be further improved, which will be explained later.

If it is determined that an obstacle exists in operation S240, the distance is measured by increasing the transmitter power of the signal generating module 410 until measuring of the distance is enabled. A distance value measured by increasing the transmitter power is compared with distance data that is pre-measured with respect to the transmitter power and distance, and using closest distance data, the distance is determined in operation S244.

Figure 3:
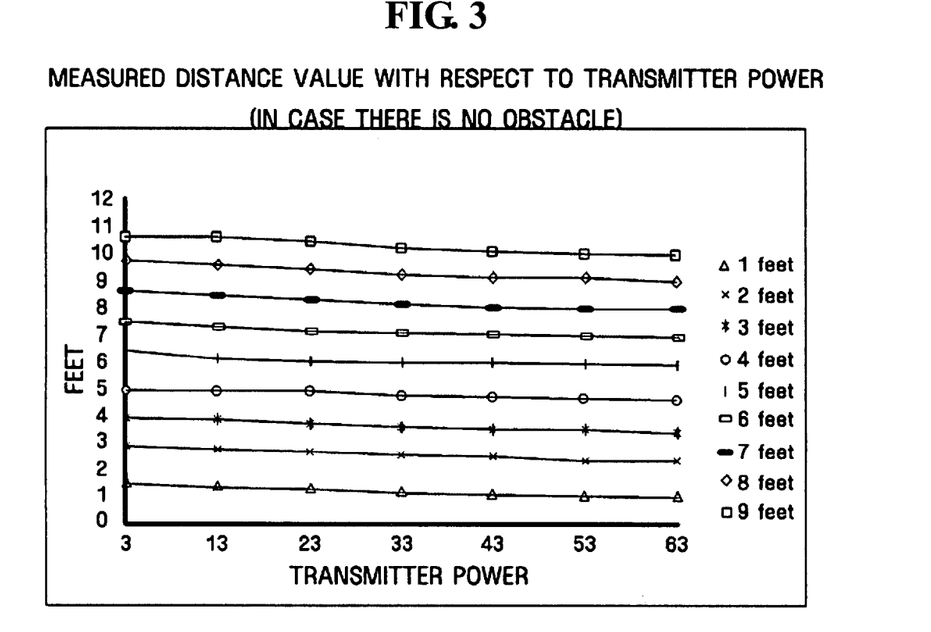
FIG. 3 is a graph showing distance data pre-measured with respect to transmitter power and distance when no obstacle exists between a signal generating module and a fixed module according to an exemplary embodiment.
Figure 4:
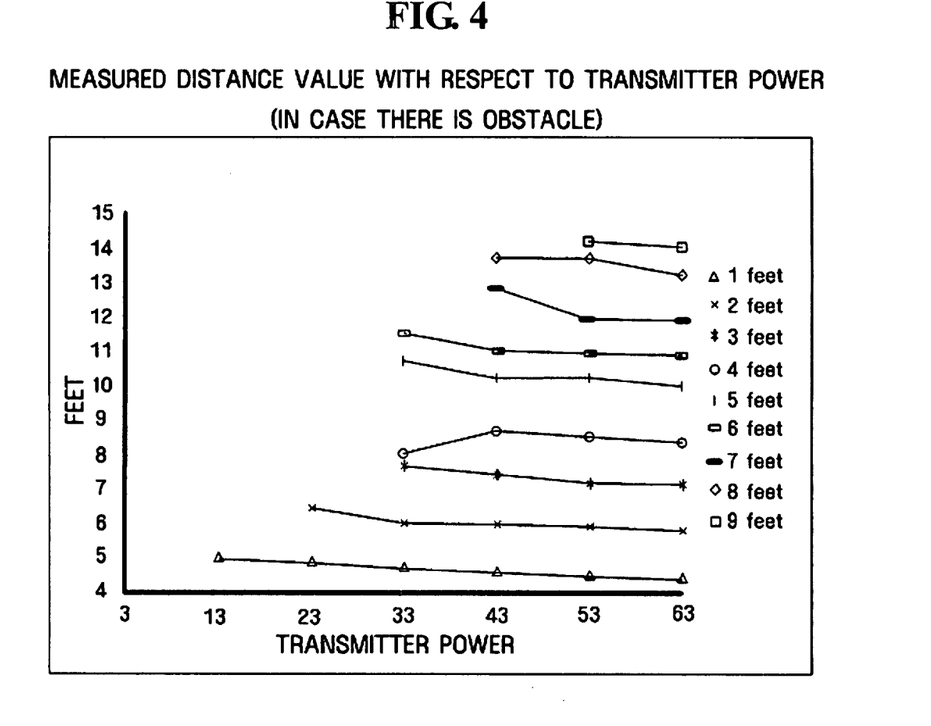
FIG. 4 is a graph showing distance data pre-measured with respect to transmitter power and distance when a concrete obstacle with a thickness of 25 cm exists between a signal generating module and a fixed module according to an exemplary embodiment.
Figure 5:
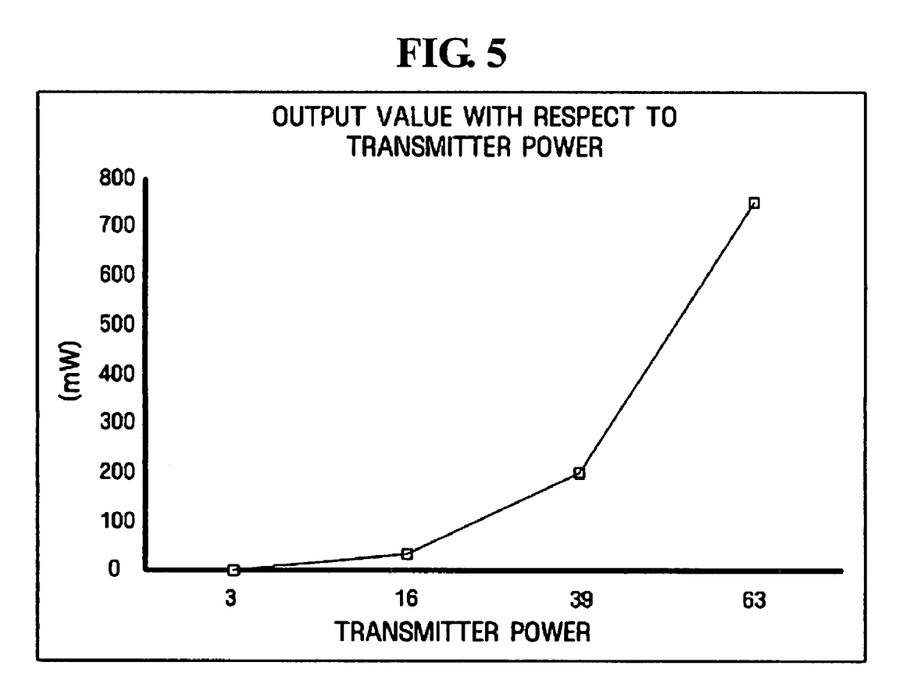
FIG. 5 is a graph illustrating the relationship between signal strength and an actual output value according to an exemplary embodiment.

FIG. 3 is a graph showing distance data pre-measured with respect to transmitter power and distance when no obstacle exists between a signal generating module 410 and a fixed module 420 according to an exemplary embodiment. FIG. 4 is a graph showing distance data pre-measured with respect to transmitter power and distance when a concrete obstacle with a thickness of 25 cm exists between a signal generating module 410 and a fixed module 420 according to an exemplary embodiment. FIG. 5 is a graph illustrating the relationship between signal strength and an actual output value according to an exemplary embodiment.

FIGS. 3 and 4 are graphs drawn based on pre-measured distance data. A UWB signal is used as an RF signal. Points in the graphs indicate measured distance values. Lines connecting points are lines connecting distance values measured by changing the transmitter power. For example, referring to FIG. 3, in the transmitter power axis, the minimum value is 3, and this is the transmitter power set to the minimum. Accordingly, if the measured distance is available at the transmitter power 3, it is determined that no obstacle exists. Referring to pre-measured distance data illustrated in FIG. 3, it can be seen that the measured distance data ranges from 1 foot to 9 feet at the transmitter power 3 because no obstacle exists. The line connecting points at the bottom of FIG. 3 is the line connecting distance values measured by changing the transmitter power of a signal at a position at a 1-foot distance. The line has a value of approximately 1.4 feet at the transmitter power 3, and thus has a little error. However, the distance value at a transmitter power 63 that is the strongest one is very close to 1 foot. That is, it can be seen that as transmitter power increases, a more accurate distance value can be obtained. The relationship can be found in other lines, too. However, it can be seen that an error becomes bigger with the increasing measured distance. For example, at the transmitter power 63, an accurate value can be obtained for a 1-foot distance, but for a 9-foot distance, the measured value is 10 feet, thereby showing the occurrence of a little error.

FIG. 4 is a graph connecting distance values with respect to the transmitter power and distance when an obstacle of a concrete wall with a thickness of 25 cm exists. Referring to FIG. 4, distances cannot be measured at the transmitter power 3 that is the minimum transmitter power. Accordingly, it can be known that an obstacle exists. Referring to FIG. 4, it can be seen that when the distance is measured at a position at a 1-foot distance, a first distance value is measured at a transmitter power 13. However, as can be seen from the graph, the distance values measured by changing the transmitter power from 13 to 63, are in the range of 4.5~5 feet. This shows that much error occurs because of interference by the obstacle. Also, referring to data measured at a position at a 2-foot distance, distance is first measured at a transmitter power 23, and the measured distance value is approximately 6 feet. Referring to the whole graph, it can be seen that with the increasing measured distance, the transmitter power of a signal at which distance is first measured increases, and when an obstacle exists, a bigger distance error occurs. Accordingly, if distance is not measured at a minimum transmitter power, it is determined that an obstacle exists, and if the transmitter power is then increased to 43 and a distance value 11 is obtained, it is determined based on the distance data illustrated in FIG. 4 that the distance is 6 feet. This is because the intersection of the transmitter power 43 and the measured value 11 illustrated in FIG. 4 is a point existing on the line connecting distance values measured by changing the transmitter power when an obstacle exists at a position at a 6-foot distance. Even though an accurate intersection does not exist, a distance value can be obtained using a proportional relationship with reference to data at a closest position.

The distance data illustrated in FIG. 4 has values varying with respect to the thickness and type of an obstacle. A distance determining module 450 has the distance data that is pre-measured with respect to the thickness and type of an obstacle. Accordingly, by measuring distance, it is determined as described above whether or not an obstacle exists. Also, by comparing the distance value that is measured when an obstacle exists with the pre-measured distance data, the distance between the signal generating module 410 and the fixed module 420 can be determined.

When it is determined that an obstacle exists, the transmitter power of a signal is increased to a value at which the measured distance is available. In this case, at a state in which the transmitter power is increased to a maximum, the measured distance is available. The measuring of distance with respect to a variety of transmitter powers in advance as illustrated in FIG. 4 is not necessary in this case, and this is because if only the distance data which is pre-measured with respect to positions at different distances at a maximum transmitter power when an obstacle exists is prepared, the measured distance is available by comparing a measured distance value with the pre-measured distance data.

When it is determined that no obstacle exists, an error is not big and therefore, the distance value measured using the signal is determined as the final distance.

However, as described above, even when no obstacle exists, a small error occurs. Accordingly, in the same manner as when an obstacle exists, when no obstacle exists, a measured distance value can be compared with the distance data pre-measured with respect to the transmitter power and distance, and the measured distance value can be corrected.

Referring to FIG. 3, for example, at the transmitter power 3 that is the value set as the minimum, measuring of distance is possible, and therefore it is determined that no obstacle exists. If the measured distance value at the transmitter power 3 is 5 feet, the actual distance can be corrected to 4 feet according to FIG. 3. When it is determined that no obstacle exists, a distance value which is measured at a transmitter power raised to a maximum may be compared with distance data pre-measured with respect to distance at a maximum transmitter power when no obstacle exists, and the measured distance value can be corrected. This is because as transmitter power increases, an error becomes smaller as described above.

FIG. 5 is a graph illustrating the relationship between transmitter powers illustrated in FIGS. 3 and 4 and actual output values. The relationship between the transmitter powers and the actual output values is not linear. The graph shows the relationship between transmitter powers and the actual signal output values when distance is measured as illustrated in FIGS. 3 and 4. However, the relationship does not have to be the same as illustrated in FIG. 5.

A method of measuring distance using an RF signal according to another exemplary embodiment will now be explained.

Figure 6:
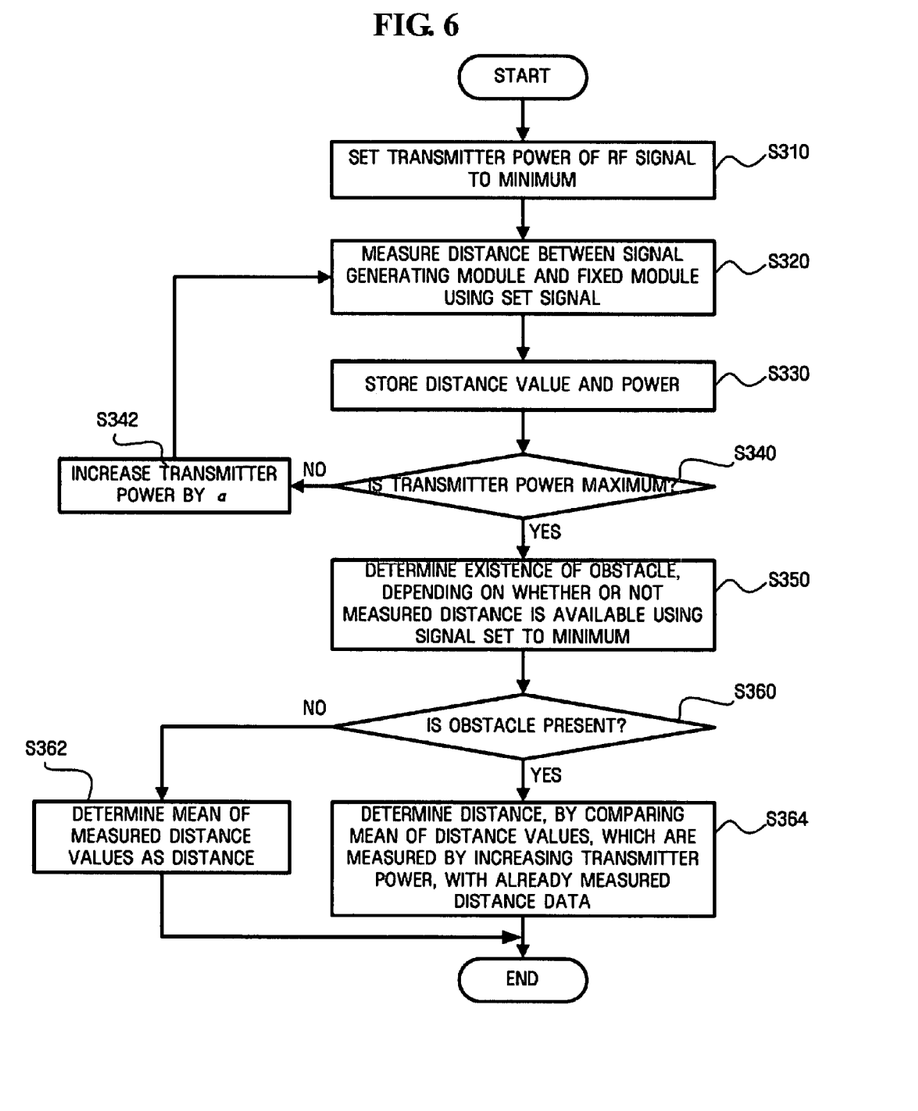
FIG. 6 is a flowchart illustrating a method of measuring distance using an RF signal according to an exemplary embodiment.

FIG. 6 is a flowchart illustrating the method of measuring distance using an RF signal according to an exemplary embodiment.

First, as described above, the transmitter power of an RF signal of a signal generating module 510 is set to a minimum so that when no obstacle exists in a range of region measured, a longest distance can be measured in operation S310.

Then, the distance between a signal generating module 510 and a fixed module 520 is measured at the transmitter power set to the minimum in operation S320. Then, the measured distance value and the transmitter power are stored in a storage module 540 in operation S330. Until the transmitter power becomes a maximum in operation S340, the transmitter power is increased by a preset interval in operation S342, distance is measured in operation S320, and the measured distance value and the transmitter power are stored again in operation S330.

Next, if the measured distance is available using a signal at a transmitter power set to a minimum based on the distance values measured with respect to transmitter powers stored in the storage module 540, it is determined that no obstacle exists between the signal generating module 510 and the fixed module 520, and if distance cannot be measured, it is determined that an obstacle exists in operation S350.

If it is determined that no obstacle exists in operation S360, the mean of the distance values measured with respect to the transmitter stored in the storage module 540 can be determined as the distance between the signal generating module 510 and the fixed module 520 in operation S362. Also, if it is determined that an obstacle exists in operation S360, distance can be determined by comparing the mean of the distance values with respect to the transmitter powers stored in the storage module 540, with distance data pre-measured with respect to a minimum transmitter power at which the measured distance is available, and distance in operation S364. As described above with reference to FIG. 4, when an obstacle exists, the value of a minimum transmitter power at which the measured distance is available varies with respect to distance. Accordingly, by comparing the mean of pre-measured distance data and the corresponding minimum transmitter power with the mean of the measured distance values and the corresponding minimum transmitter power, distance can be determined.

As described above, the pre-measured distance data value varies with respect to thickness and type of an obstacle, and a distance determining module 560 has data with respect to thickness and type of an obstacle in advance.

If it is determined that no obstacle exists, the mean of the distance values stored in the storage module 540 is determined as the final distance. The distance can be corrected by comparing the mean of the measured distance values with the mean of the distance data pre-measured with respect to transmitter power and distance. That is, referring to FIG. 3, if the mean value of the distance values measured at a position at a 3-foot distance by changing the transmitter power is 3.7 feet, and the mean of the distance values stored in the storage module 540 is 3.7 feet, the actual distance between the signal generating module 510 and the fixed module 520 is 3 feet.

An apparatus for measuring distance using an RF signal according to an exemplary embodiment will now be explained.

Figure 7:
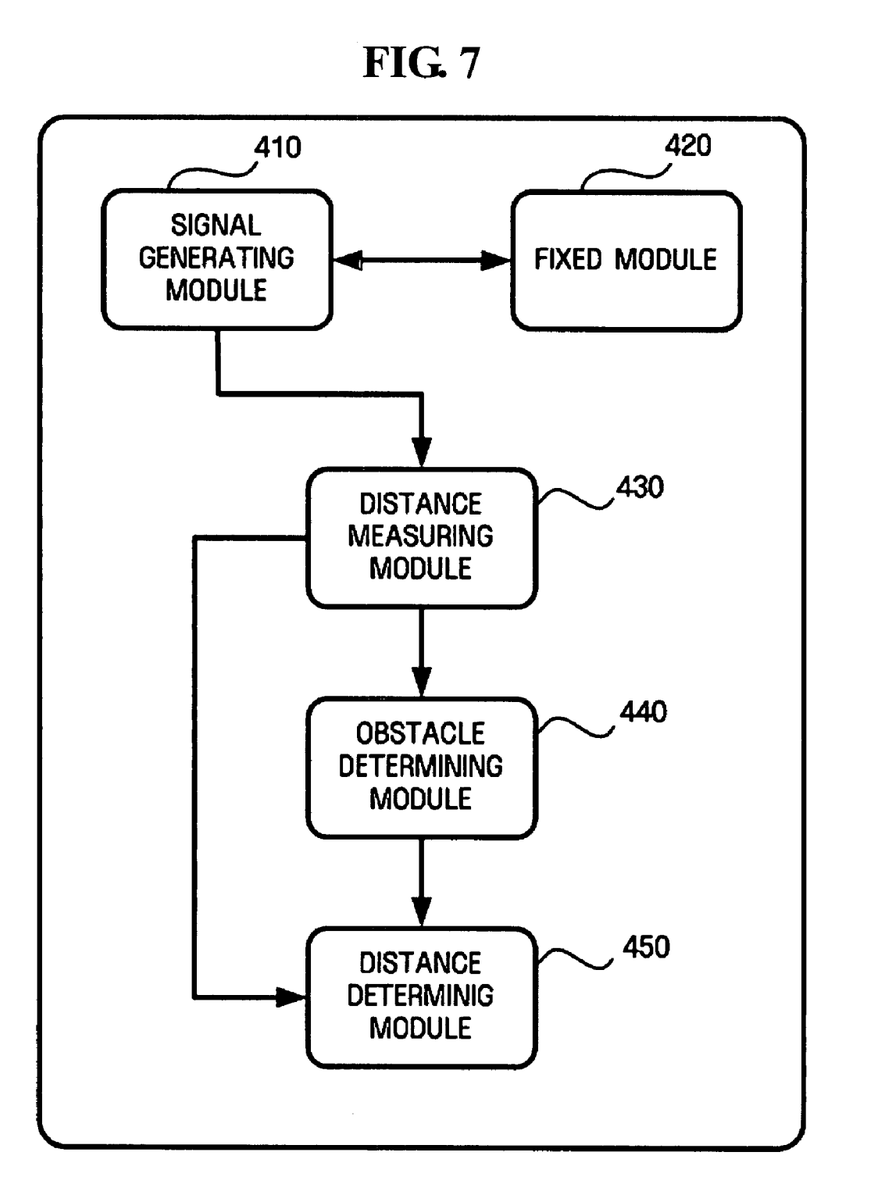
FIG. 7 is a block diagram illustrating an apparatus for measuring distance using an RF signal according to an exemplary embodiment.

FIG. 7 is a block diagram illustrating an apparatus for measuring distance using an RF signal according to an exemplary embodiment.

The apparatus for measuring distance using an RF signal according to an exemplary embodiment may be composed of a signal generating module 410, a fixed module 420, a distance measuring module 430, an obstacle determining module 440, and a distance determining module 450.

The signal generating module 410 generates and transmits an RF signal of a predetermined waveform, and receives again the transmitted signal. The RF signal may be a UWB signal or a Bluetooth signal. While being mounted on a mobile robot and moving, the signal generating module 410 can measure the distance to the fixed module 120.

The fixed module 420 at a fixed position receives the signal transmitted by the signal generating module 410, and transmits an RF signal having the same waveform as that of the received signal, back to the signal generating module 410.

The distance measuring module 430 measures the distance between the signal generating module 410 and the fixed module 420 using the signal generated by the signal generating module 410. The measured distance is available using the time taken from when the signal generated by the signal generating module 410 is transmitted to the fixed module 420 until when the signal transmitted from the fixed module 420 is again received by the signal generating module 410.

The obstacle determining unit 440 determines whether or not an obstacle exists between the signal generating module 410 and the fixed module 420. As described above, the signal generating module 410 generates an RF signal at a transmitter power set to a minimum so that when no obstacle exists in a measuring region, a longest distance can be measured. Using the RF signal, the distance measuring module 430 measures the distance. In this case, if the measured distance is available at the minimum transmitter power, it is determined that no obstacle exists. If distance cannot be measured, it is determined that an obstacle exists.

The distance determining module 450 determines the distance using the distance value measured in the distance measuring module 430 and distance data that is pre-measured with respect to transmitter power and distance.

If the obstacle determining unit 440 determines that no obstacle exists, the distance determining module 450 determines the distance value measured at the transmitter power set to the minimum as the actual distance. The distance determining module 450 may correct the measured distance value, by comparing the distance value measured at the transmitter power set to the minimum, with the distance data that is pre-measured with respect to transmitter power and distance.

This is because even when no obstacle exists, an error becomes bigger with the increasing distance. Furthermore, the distance determining module 450 can correct the measured distance value, by comparing the distance value measured by setting the transmitter power to a maximum, with distance data that is pre-measured with respect to distance at a transmitter power set to a maximum when no obstacle exists. As described above, this is because as transmitter power increases, a distance value can be measured more accurately.

If the obstacle determining module 440 determines that an obstacle exists, the distance determining module 450 determines the actual distance, by comparing the distance value measured by increasing the transmitter power so that the measured distance is available, and the transmitter power, with distance data that is pre-measured with respect to distance. In this case, the distance data that is pre-measured may vary with respect to thickness and type of an obstacle. The distance determining module 450 can determine the actual distance, by comparing the distance value measured at a transmitter power set to a maximum, with distance data that is pre-measured with respect to distance at a transmitter power set to a maximum when an obstacle exists. As described above, this is because as transmitter power increases, a distance value can be measured more accurately.

An apparatus for measuring distance using an RF signal according to an exemplary embodiment will now be explained.

Figure 8:
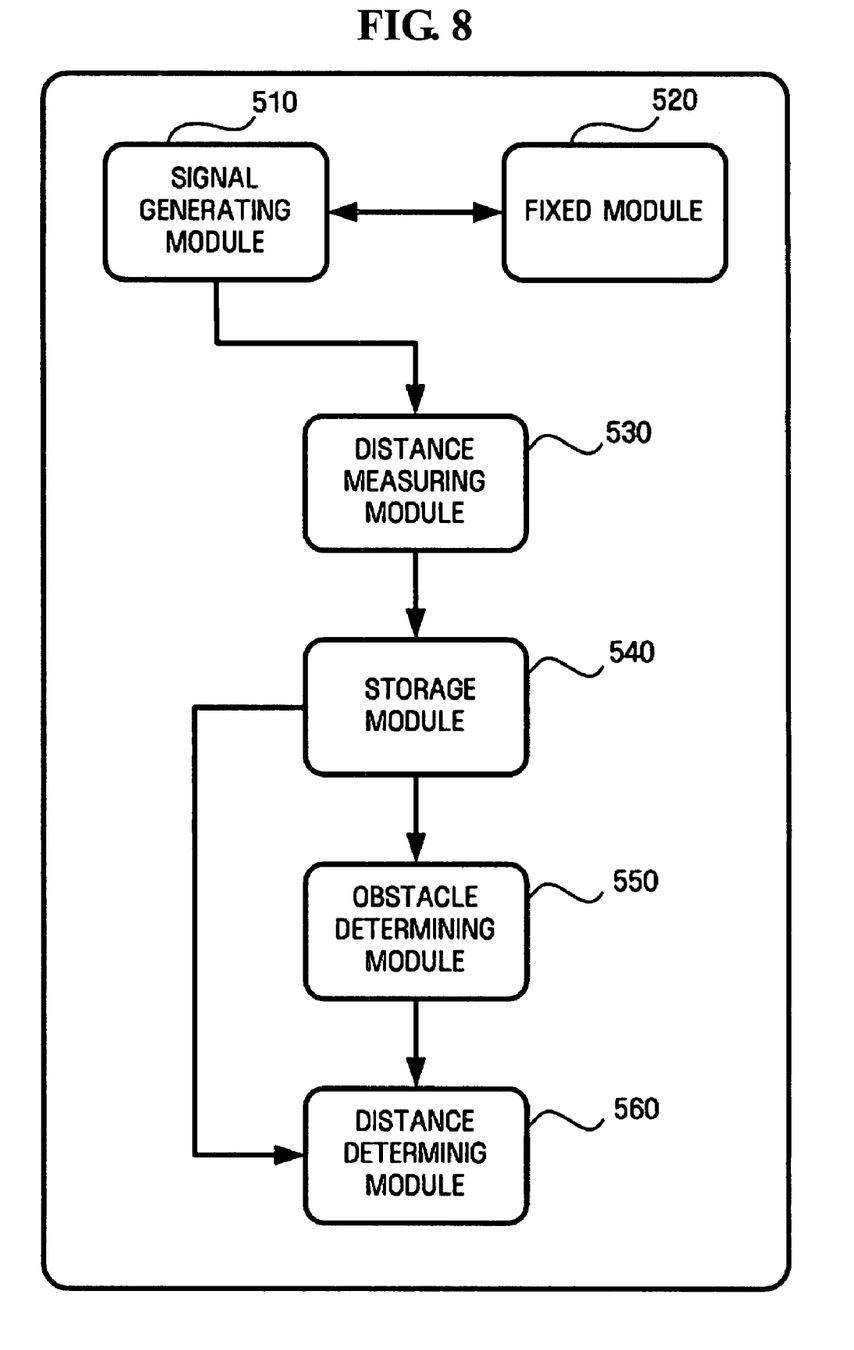
FIG. 8 is a block diagram illustrating an apparatus for measuring distance using an RF signal according to another exemplary embodiment.

FIG. 8 is a block diagram illustrating an apparatus for measuring distance using an RF signal according to another exemplary embodiment.

The apparatus for measuring distance using an RF signal according to an exemplary embodiment may be composed of a signal generating module 510, a fixed module 520, a distance measuring module 530, a storage module 540, an obstacle determining module 550, and a distance determining module 560.

Explanation on the signal generating module 510, the fixed module 520, and the distance measuring module 530 is the same as described above, and therefore, the explanation will be omitted here.

The storage module 540 stores the distance values measured by changing a transmitter power and the transmitter powers. The distance values with respect to the transmitter power stored in the storage module 540 are read by the obstacle determining module 550 and the distance determining module 560 and are used in order to determine whether or not an obstacle exists and an actual distance, respectively.

As described above, the obstacle determining module 550 determines whether or not an obstacle exists between the signal generating module 510 and the fixed module 520. The transmitter power of an RF signal is set to a minimum so that when no obstacle exists in a range of region measured, a longest distance can be measured. Then, the distance measuring module 530 measures distance by increasing the transmitter power by a preset interval until the transmitter power becomes a maximum, and the storage module 540 stores the distance values with respect to the transmitter powers. In this case, the obstacle determining module 550 fetches data stored in the storage module 540. Then, if the measured distance is available using the signal generated at the transmitter power set to the minimum, the obstacle determining module 550 determines that no obstacle exists, and if distance cannot be measured, the obstacle determining module 550 determines that an obstacle exists.

The distance determining module 560 determines an actual distance according a different method depending on whether or not an obstacle exists. If no obstacle exists, the mean of the distance values with respect to the transmitter powers stored in the storage module 540 is determined as the actual distance. Also, the distance can be corrected using the mean of the measured distance values with the mean of the distance values that are pre-measured with respect to transmitter power and distance when no obstacle exists. If an obstacle exists, a minimum transmitter power at which a measured distance is available when an obstacle exists and the mean of measured distance values stored in the storage module 540 are compared with distance data that is pre-measured with respect to transmitter power and distance when an obstacle exists, thereby determining the actual distance.

In addition to the above-described exemplary embodiments, exemplary embodiments can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. The medium/media may also be a distributed network, so that the computer readable code/instructions are stored/transferred and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein [when used in connection with execution of code/instructions], denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of exemplary embodiments, or they may be of the kind well-known and available to those skilled in the art of computer hardware and/or computer software.

According to a method, apparatus, and medium for measuring a distance using an RF signal according to exemplary embodiments as described above, one or more of the following advantages can be obtained.

First, using an RF signal, a measured distance is available even when LOS is not guaranteed.

Secondly, by comparing distance data pre-measured with a measured distance value, an actual distance can be accurately measured.

Thirdly, by changing the transmitter power of an RF signal, it is determined whether or not an obstacle exists between two things the distance between which is desired to be measured.

Although a few exemplary embodiments have been shown and described, it would be appreciated by those skilled in the art that changes may be made in these exemplary embodiments, the scope of which is defined in the claims and their equivalents.

What is claimed is:

1. A method for measuring a distance using a radio frequency (RF) signal, the method comprising:
    setting a transmitter power of an RF signal of a signal generating module to a minimum so as to measure the longest distance within a region when no obstacle exists between the signal generating module and a fixed module;
    measuring a distance between the signal generating module and the fixed module using the RF signal whose transmitter power is set to the minimum;
    if the measured distance between the signal generating module and the fixed module is available, determining that no obstacle exists therebetween, and if the measured distance is not available, determining that an obstacle exists therebetween; and
    determining the distance according to the result of the determination of existence of an obstacle.

2. The method of claim 1, wherein if it is determined that no obstacle exists, a value of the measured distance is determined as the distance.

3. The method of claim 2, further comprising correcting the value of the measured distance by comparing the value of the measured distance with distance data that is pre-measured with respect to the transmitter power and the distance when the obstacle does not exist.

4. The method of claim 2, further comprising correcting the measured distance by comparing a value of the distance measured when the transmitter power is set to a maximum with distance data that is pre-measured with respect to the distance at a maximum transmitter power when the obstacle does not exist.

5. The method of claim 1, further comprising, if it is determined that the obstacle exists, determining the distance by comparing the distance value measured by increasing the transmitter power so that the measured distance is available, with distance data that is pre-measured with respect to the transmitter power and the distance when the obstacle exists.

6. The method of claim 1, further comprising, if it is determined that the obstacle exists, determining the distance by comparing a value of the distance measured when the transmitter power is set to a maximum with distance data that is pre-measured at a maximum transmitter power when the obstacle does not exist.

7. The method of claim 1, wherein the signal generating module moves with being mounted on a mobile robot.

8. A method of measuring a distance using an RF signal, the method comprising:
    setting the transmitter power of an RF signal of a signal generating module to a minimum so that when no obstacle exists in a region between the signal generating module and a fixed module, a longest distance within the region can be measured;
    generating the signal by increasing the transmitter power set to the minimum, of the signal, by a preset interval until the transmitter becomes a maximum, and storing the distance values measured between the signal generating module and the fixed module, and the transmitter powers;
    using the stored distance values with respect to transmitter powers, if the measured distance is available using the signal at the transmitter power set to the minimum, determining that no obstacle exists between the signal generating module and the fixed module, and if the distance cannot be measured, determining that an obstacle exists; and
    determining the distance according to whether or not an obstacle exists.

9. The method of claim 8, wherein if it is determined that no obstacle exists, the mean of the values of the measured distance with respect to the transmitter powers is determined as the distance.

10. The method of claim 9, further comprising correcting the distance, by comparing the mean of the measured distance values with the mean of distance data that is pre-measured with respect to the transmitter power and the distance when the obstacle does not exist.

11. The method of claim 8, wherein if it is determined that the obstacle exists, the distance is determined by comparing the minimum transmitter power at which the measured distance is available, and the mean of the measured distance values, with distance data that is pre-measured with respect to the transmitter power and the distance when the obstacle exists.

12. The method of claim 8, wherein the signal generating module moves with being mounted on a mobile robot.

13. An apparatus for measuring a distance using an RF signal, the apparatus comprising:
    a signal generating module to generate an RF signal and to receive back the transmitted signal;
    a fixed module at a fixed position to receive the transmitted signal and then, to transmit the received signal;
    a distance measuring module to measure the distance between the signal generating module and the fixed module, using the generated signal;

an obstacle determining module to determine whether or not an obstacle exists between the signal generating module and the fixed module; and a distance determining module to determine the distance using the measured distance value and distance data that is pre-measured with respect to the transmitter power and the distance, wherein the signal generating module generates an RF signal, by setting the transmitter power of the RF signal to a minimum so that when no obstacle exists between the signal generating module and the fixed module in the region, a longest distance within the region can be measured, and the distance measuring module measures the distance using the generated signal, and if the measured distance is available, the obstacle determining module determines that no obstacle exists between the signal generating module and the fixed module, and if the distance cannot be measured, the obstacle determining module determines that the obstacle exists.

14. The apparatus of claim 13, wherein if the obstacle determining module determines that no obstacle exists, the distance determining module determines the measured distance value as the distance.

15. The apparatus of claim 14, wherein the distance determining module corrects the measured distance value, by comparing the measured distance value with distance data that is pre-measured with respect to the transmitter power and the distance when the obstacle does not exist.

16. The apparatus of claim 14 wherein the distance determining module corrects the measured distance value, by comparing the distance value measured by increasing the transmitter power to a maximum, with distance data that is pre-measured with respect to the distance at the transmitter power set to a maximum when the obstacle does not exist.

17. The apparatus of claim 13, wherein if the obstacle determining module determines that the obstacle does not exist, the distance determining module determines the distance, by comparing the distance value measured by increasing the transmitter power so that the measured distance is available, with distance data that is pre-measured with respect to the transmitter power and the distance.

18. The apparatus of claim 13, wherein the signal generating module moves with being mounted on a mobile robot.

19. The apparatus of claim 13, wherein the distance data that is pre-measured is measured with respect to thickness and type of the obstacle.

20. The apparatus of claim 13, wherein if the obstacle determining module determines that the obstacle exists, the distance determining module determines the distance, by comparing the distance value measured by increasing the transmitter power to a maximum, with distance data that is pre-measured with respect to the distance at the transmitter power set to a maximum when the obstacle exists.

21. An apparatus for measuring a distance using an RF signal, the apparatus comprising:

a signal generating module to generate an RF signal and receiving back the transmitted signal;

a fixed module at a fixed position to receive the transmitted signal and then, to transmit the received signal;

a distance measuring module to measure the distance between the signal generating module and the fixed module, using the generated signal;

a storage module to store the measured distance and the transmitter power;

an obstacle determining module to determine whether or not an obstacle exists between the signal generating module and the fixed module; and a distance determining module to determine the distance using the measured distance value and distance data that is pre-measured with respect to the transmitter power and the distance, wherein the signal generating module sets the transmitter power of an RF signal to a minimum so that when no obstacle exists between the signal generating module and a fixed module in a region, a longest distance within the region measured can be measured, and the distance measuring module measures the distance by increasing the transmitter power of the signal by a preset interval until the transmitter power becomes a maximum, and the storage module stores the measured distance values and the corresponding transmitter powers, and if the measured distance is available using the signal generated at the transmitter power set to the minimum, the obstacle determining module determines that no obstacle exists between the signal generating module and the fixed module, and if the distance cannot be measured, the obstacle determining module determines that the obstacle exists.

22. The apparatus of claim 21, wherein if the obstacle determining module determines that the obstacle does not exist, the distance determining module determines the mean of the distance values measured with respect to the transmitter powers.

23. The apparatus of claim 22, wherein the distance determining module corrects the distance, by comparing the mean of the measured distance values with the mean of distance data that is pre-measured with respect to the transmitter power and the distance when the obstacle does not exist.

24. The apparatus of claim 21, wherein if the obstacle determining module determines that the obstacle exists, the distance determining module determines the distance, by comparing the minimum transmitter power at which the measured distance is available and the mean of the measured distance values, with distance data that is pre-measured with respect to the distance at the transmitter power when the obstacle exists.

25. The apparatus of claim 21, wherein the distance data that is pre-measured is measured with respect to thickness and type of the obstacle.

* * * * *